United States Patent [19]

Zörgiebel et al.

[11] Patent Number: 4,913,277

[45] Date of Patent: Apr. 3, 1990

[54] TRANSPORT DEVICE FOR REDIRECTING PIECE GOODS IN ONE PLANE

[75] Inventors: Karl H. Zörgiebel, Reichelsheim; Konrad Ackermann, Reichesheim; Ernst Strassner, Bad Konig, all of Fed. Rep. of Germany

[73] Assignee: Carl Schenck AG, Fed. Rep. of Germany

[21] Appl. No.: 243,910

[22] Filed: Sep. 13, 1988

[30] Foreign Application Priority Data

Oct. 12, 1987 [EP] European Pat. Off. ........ 87114856.5

[51] Int. Cl.⁴ ............................................. B65G 47/46
[52] U.S. Cl. ..................................... 198/369; 198/782
[58] Field of Search ............... 198/367, 369, 372, 782, 198/787, 789, 790; 193/35 MD

[56] References Cited

U.S. PATENT DOCUMENTS 3,910,402 10/1975 Dean ..................................... 198/782

FOREIGN PATENT DOCUMENTS

| 1783683 | 11/1957 | Fed. Rep. of Germany . |
| 2335874 | 1/1975 | Fed. Rep. of Germany ...... 198/782 |
| 2261936 | 2/1978 | Fed. Rep. of Germany . |
| 56202 | 3/1987 | Japan ................................... 198/782 |
| 674955 | 7/1979 | U.S.S.R. · ........................ 193/35 MD |

Primary Examiner—Joseph E. Valenza
Attorney, Agent, or Firm—Connolly and Hutz

[57] ABSTRACT

A transport device for transporting and redirecting piece goods in one plane wherein the piece goods are supported on a grid of driven roller bodies protruding in part through a cover. A grid is formed of transport rollers for the purpose of obtaining a redirection of goods to be transported without producing a relative shifting between the cover and the support carrying the roller bodies and at the same time the contact pressure between the rollers and goods is minimal. The transport rollers are arranged in a cylindrical housing and are driven by a drive motor via drive shafts and friction pulleys connected by friction with the transport rollers.

6 Claims, 3 Drawing Sheets

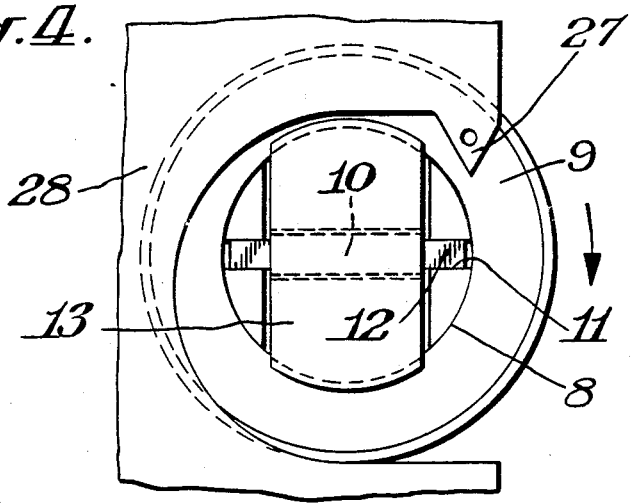
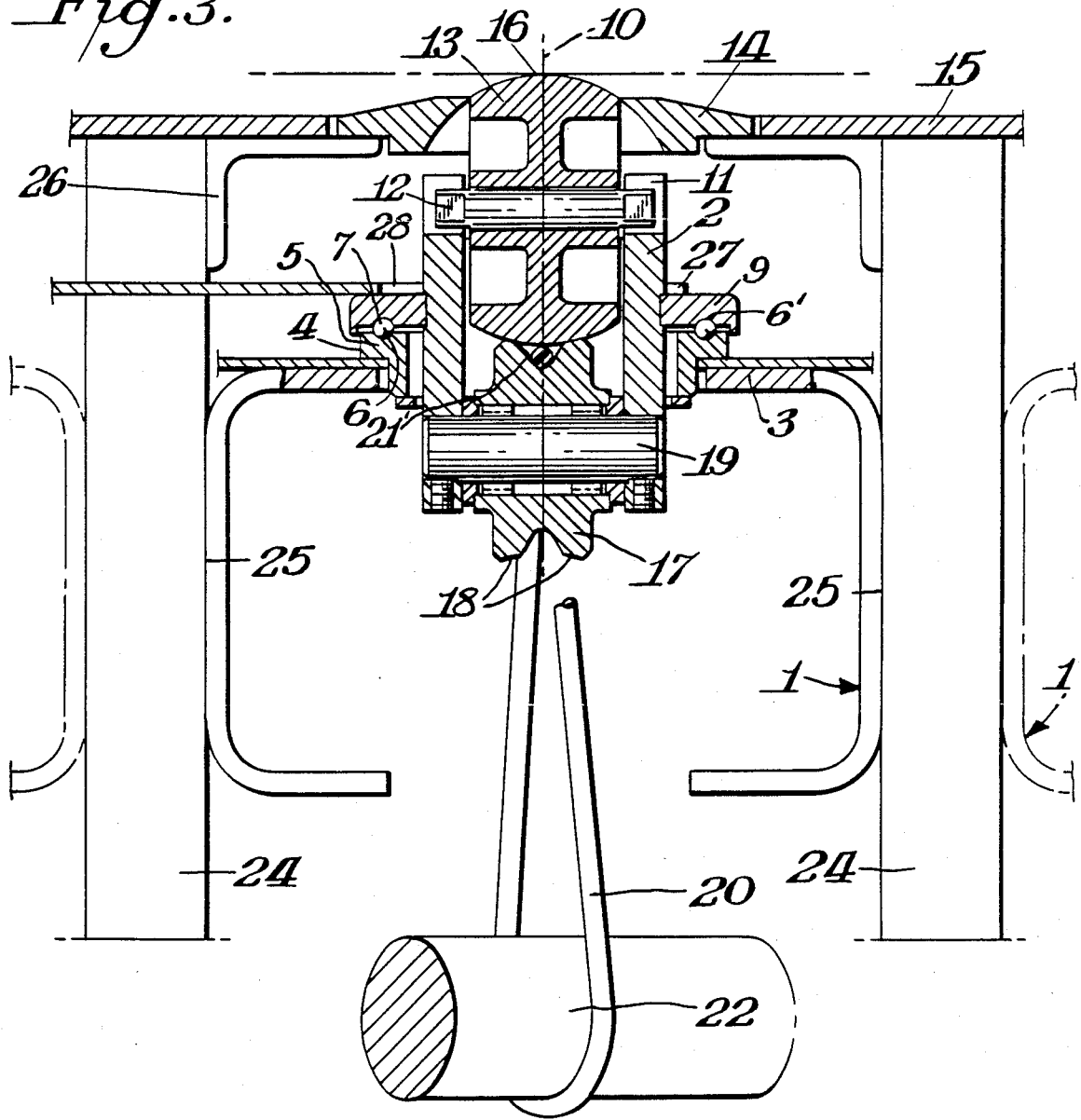

TRANSPORT DEVICE FOR REDIRECTING PIECE GOODS IN ONE PLANE

BACKGROUND OF THE INVENTION

The present invention relates to a transport device for redirecting piece goods in one plane whereby the piece goods are supported on a grid of orthogonal rows of driven roller bodies which, in part, protrude through a cover.

German Patent No. 22 61 936 discloses a transport device in which the roller elements are designed as balls rotatably supported in a stationary ball retaining plate and wherein drive discs are rotatably installed on a common bearing plate which can be moved in their plane by means of a guiding device in an area determined by the dimensions of the drive disc. Such a transport device permits a redirecting of the piece goods to be transported but since balls are used, considerable contact pressure is produced between the balls and the drive discs and also between the balls and piece goods to be transported. Relative shifting in a redirecting procedure between the cover and the support carrying the roller bodies is inevitable.

German Utility Patent No. 17 83 683 discloses an apparatus for the transport of metal sheets on rollers whereby the support rollers are driven via a bevel gear drive and the housing containing the bevel gear drive with the over-mounted support roller must be turned via another drive in order to turn the support rollers. Such an arrangement is expensive and susceptible to problems.

SUMMARY OF THE INVENTION

Accordingly, one object of the invention is a transport device that attains a redirection of goods to be transported without the production of a relative shifting between the cover and the support carrying the roller bodies by reduced contact pressure. The inventive arrangement of a transport roller via a friction pulley considerably reduces the contact pressure and results in a rotation about the vertical axis of the friction pulley and transport roller without relative shifting.

The transport device of the present invention is a compact construction which does not require additional supports for the transport rollers and friction wheels which are arranged in a common housing.

The transport device for redirecting piece goods according to the invention can be readily built-in in rectilinear conveyor systems without the necessity of lowering the transport units being conveyed in a different direction or raising the transport device for redirection when redirection of piece goods becomes necessary. In the present invention, transport and redirection are accomplished in the same plane.

BRIEF DESCRIPTION OF THE DRAWING

Novel features and advantages of the present invention in addition to those noted above will become apparent to those of ordinary skill in the art from a reading of the following detailed description in conjunction with the accompanying drawing wherein similar reference characters refer to similar parts and in which:

FIG. 3 is a cross-sectional view taken along line 3—3 of FIG. 1 but with the transport roller housing and transport roller rotated 90°; and FIG. 4 is a top plan view showing the adjustment mechanism rotating the housing and transport roller 90° from the position of FIG. 1 to the position of FIG. 3.

DETAILED DESCRIPTION OF THE INVENTION

Figure 1:
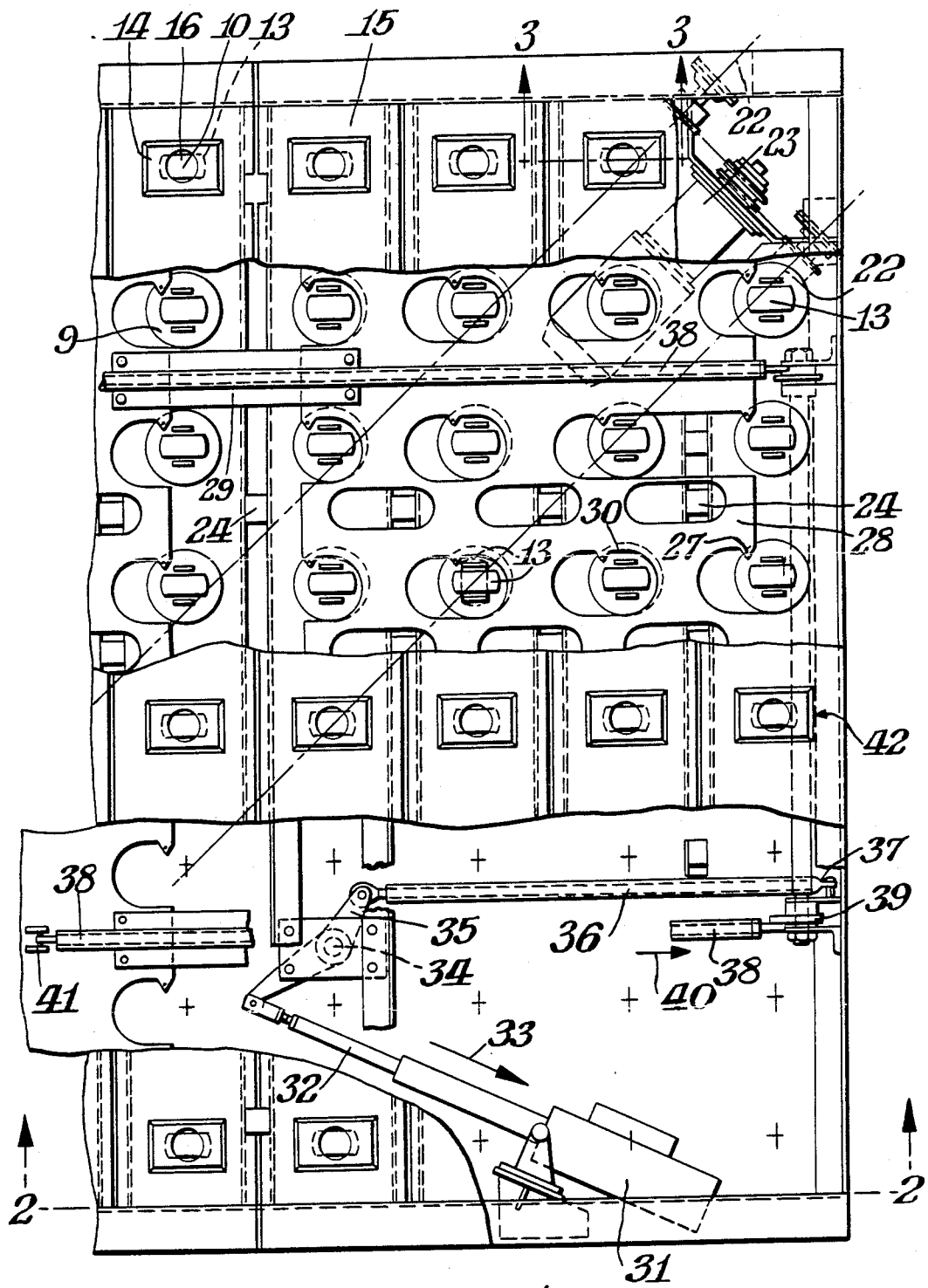
FIG. 1 is a top plan view of a transport device according to the present invention.

As shown in the drawing, a transport device includes housings 2 mounted in a U-shaped carrier 1 extending over the entire width of the transport device. Housings 2 are supported in the link surface 3 of the U-shaped carrier 1 in an annular flange 4. The upper face of a flange 5 carries an annular groove 6 for the accomodation of roller balls 7. The housing 2 at its outside surface 8 carries a support ring 9 which also carries an annular groove 6' to accomodate the balls 7. The housing can be turned about its vertical axis 10 with this arrangement. In the upper part of the housing 2, slots 11 are provided in which a shaft 12 is clearly prevented while at the same time a simple removal of the transport roller 13 from the housing 2 is provided when a guide insert 14 is taken from a cover 15 of the transport device.

The transport roller 13 protrudes above the cover 15 with a convex bearing surface 16. Roller 13 is driven by the concave crowned surface 18 of a friction pulley 17. The friction pulley 17 is located directly under the transport roller 13 and is supported on a shaft 19 mounted in the housing 2.

The friction pulley 17 is driven by a round belt 20, guided in a groove 21 of the friction pulley 17. The round belt 20 is wrapped around a drive shaft 22 which runs in a plane parallel to the conveying and redirecting plane. Drive shaft 22 is driven by a drive motor 23 as shown in FIGS. 1 and 2.

Figure 2:
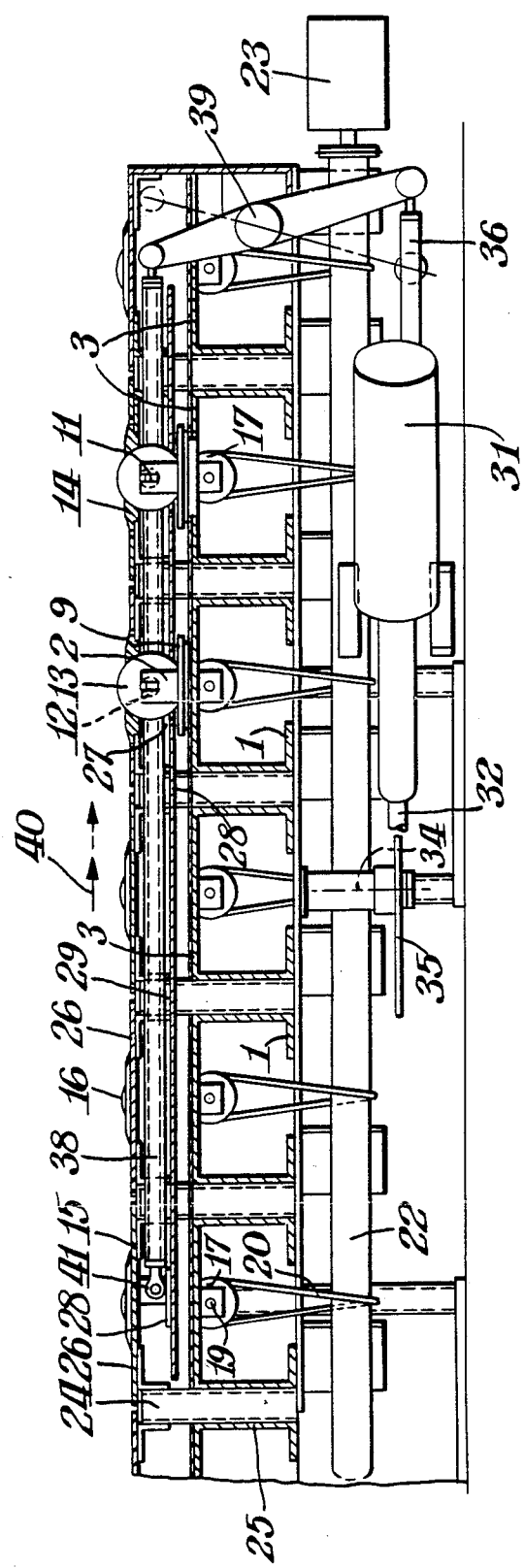
FIG. 2 is a cross-sectional view taken along line 2—2 of FIG. 1.

As best shown in FIGS. 1 and 2 the U-shaped carriers 1 are connected by columnar supports 24 positioned between the legs 25 of the carriers. The interconnecting link surfaces 3 of the U-shaped carriers 1 carry the housings 2 with the transport rollers 13 and the friction pulleys 17. The cover 15 is connected by L-shaped brackets 26 attached to the columns 24 so that the transport rollers 13 protrude from the cover while being guided in a guide insert 14.

The housings 2 are connected via arms 27 of adjusting mechanisms 28, as shown in FIG. 4. In the illustrated embodiment, the adjusting mechanisms 28 consist of individual plates interconnected by plates 29. The adjusting mechanisms 28 are supported on the support ring 9 and are moved in a straight line to another end position by an adjusting motor 31. As a result of the rectilinear movement of the adjusting mechanisms 28, arms 27 connected with these adjusting mechanisms 28 move the housings 2 by an angle of 90° so that the piece goods being transported are redirected a right angle turn in the same plane as the transport direction.

In order to move the position of the transport rollers 13 shown in FIG. 1 to a perpendicular position to the first position, a piston 32 is moved in the direction of an arrow 33. As a result, a double lever 35 rotatable about a pivot point 34 is induced to correspondingly move a push rod 36 so that a connecting rod 38 is moved via second double lever 37 about another pivot point 39 in the direction of arrow 40. The connecting rod 38 is connected at 41 with one of the adjusting mechanisms 28. The adjusting mechanism 28 includes the arms 27 each of which is pivotally connected to the support ring 9 of each housing 2. When the adjusting mechanisms 28 are shifted to the right, as viewed in FIG. 1, by the rod 38, the portions 27 of the adjustment mechanisms function to rotate support rings 9 in clockwise direction whereby rollers 13 are rotated 90°.

Instead of a 90° turn, the transport roller may also be rotated another angular amount so that any requirement in any direction can be met.

The embodiment shown in the drawing has a quadratic transport roller grid. In this case, the drive shafts 22 are inclined at an angle of 45° to the 90° transport direction. But if the redirecting device for technical reasons has a roller grid which deviates from a quadratic roller grid, the angular position of the drive shafts 22 changes of necessity to a 90° redirection of the piece goods transported on this transport roller grid 42.

What is claimed is:

1. A transport device for redirecting piece goods in the same plane as the goods are transported along a planar path of travel, the device comprising carrier members, a plurality of transport roller housings each rotatably supported by the carrier members for rotation about a substantially vertical axis, a transport roller connected to each housing for rotation about a substantially horizontal axis, a friction pulley in engagement with the transport roller connected to each housing for rotation about a substantially horizontal axis parallel to the axis of rotation of the transport roller, a drive shaft positioned below the friction pulley, a motor connected to rotate the drive shaft, transmission means between the drive shaft and the friction pulley for rotating the pulley and the transport roller in engagement therewith when the drive shaft rotates, and an adjusting mechanism for rotating the transport roller housings about their vertical axes whereby the direction of rotation of the transport rollers is changed and the piece goods supported thereby are redirected without changing the elevation thereof, and wherein the carrier members comprise a plurality of inverted U-shaped carriers parallel to one another and extending the width of the transport device, each U-shaped carrier having opposed leg surfaces and an interconnecting link surface, spaced apart openings in the interconnecting link surface each constructed and arranged to receive one of the transport roller housings, and annular flange on each housing facing an annular flange surrounding each opening in the interconnecting link surface, and ball bearings between the flanges to facilitate rotation of the housing about their vertical axes by the adjusting mechanism.

2. A transport device as in claim 1 wherein the adjusting mechanism includes operator portions pivotally attached to the annular flanges of the transport roller housings, and means for shifting those portions toward and away from the housings to thereby rotate the housings about their vertical axes.

3. A transport device as in claim 2 wherein the means for shifting the operator portions includes an arrangement of rods and levers.

4. A transport device as in claim 1 wherein the friction pulley is a V-belt pulley and the transmission means connected to each pulley comprises a belt trained around the pulley and the drive shaft.

5. A transport device for redirecting piece goods in the same plane as the goods are transported along a planar path of travel, the device comprising carrier members, a plurality of transport roller housings each rotatably supported by the carrier members for rotation about a substantially vertical axis, a transport roller connected to each housing for rotation about a substantially horizontal axis, a friction pulley in engagement with the transport roller connected to each housing for rotation about a substantially horizontal axis parallel to the axis of rotation of the transport roller, a drive shaft positioned below the friction pulley, a motor connected to rotate the drive shaft, transmission means between the drive shaft and the friction pulley for rotating the pulley and the transport roller in engagement therewith when the drive shaft rotates, and an adjusting mechanism for rotating the transport roller housings about their vertical axes whereby the direction of rotation of the transport rollers is changed and the piece goods supported thereby are redirected without changing the elevation thereof, and wherein the friction pulley is a V-belt pulley and the transmission means connected to each pulley comprises a belt trained around the pulley and the drive shaft, and wherein each transport roller has a convex outer surface and each associated friction pulley has a complementary concave outer surface in engagement with the convex surface of the roller.

6. A transport roller device as in claim 1 wherein each transport roller includes a support shaft about which it rotates, and means securing the shaft to the transfer roller housing and preventing the shaft from rotating.

* * * * *